United States Patent
Sayeedi

(10) Patent No.: US 7,327,704 B2
(45) Date of Patent: Feb. 5, 2008

(54) METHOD AND APPARATUS FOR FACILITATING DORMANT MODE, PACKET DATA MOBILE HANDOFFS

(75) Inventor: Shahab M. Sayeedi, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 977 days.

(21) Appl. No.: 10/115,308

(22) Filed: Apr. 3, 2002

(65) Prior Publication Data

US 2003/0063584 A1    Apr. 3, 2003

Related U.S. Application Data

(60) Provisional application No. 60/326,909, filed on Oct. 3, 2001.

(51) Int. Cl.
*H04Q 7/00* (2006.01)
(52) U.S. Cl. ............... 370/329; 370/401; 370/338
(58) Field of Classification Search ............ None
See application file for complete search history.

(56) References Cited

U.S. PATENT DOCUMENTS

| | | | |
|---|---|---|---|
| 6,519,235 B1 * | 2/2003 | Kim et al. | 370/331 |
| 6,907,016 B2 * | 6/2005 | Madour et al. | 370/331 |
| 6,912,214 B2 * | 6/2005 | Madour et al. | 370/340 |
| 6,950,415 B2 * | 9/2005 | Chang et al. | 370/331 |
| 2001/0038615 A1 * | 11/2001 | Chang | 370/329 |
| 2002/0048266 A1 * | 4/2002 | Choi et al. | 370/331 |
| 2002/0057658 A1 | 5/2002 | Lim | |
| 2002/0145990 A1 | 10/2002 | Sayeedi | |
| 2003/0035393 A1 * | 2/2003 | Sinnarajah et al. | 370/335 |

FOREIGN PATENT DOCUMENTS

| WO | WO01/80591 | 10/2001 |
|---|---|---|
| WO | WO00/05828 | 2/2003 |

OTHER PUBLICATIONS

Sayeedi, Shahab "Authenitcation Proceudre for Dormant Mode Packet Data Handoffs". Motorola, Inc. Sep. 17, 2001.

\* cited by examiner

*Primary Examiner*—Bob A. Phunkulh
(74) *Attorney, Agent, or Firm*—Jeffrey K. Jacobs

(57) ABSTRACT

To address the need for a method and apparatus to more efficiently facilitate dormant mode, packet data mobile handoffs, the present invention provides more efficient messaging between the BS and MSC involved in the handoff. Prior art messaging that provides for the establishment of a traffic channel for the MS is streamlined in cases where a traffic channel is not needed. Also, connectionless messages are used to save the processing otherwise required to establish a connection between the BS and MSC. Thus, using the present invention, dormant mode, packet data mobile handoffs can be processed with less signaling and fewer system resources than by using the prior art.

26 Claims, 2 Drawing Sheets

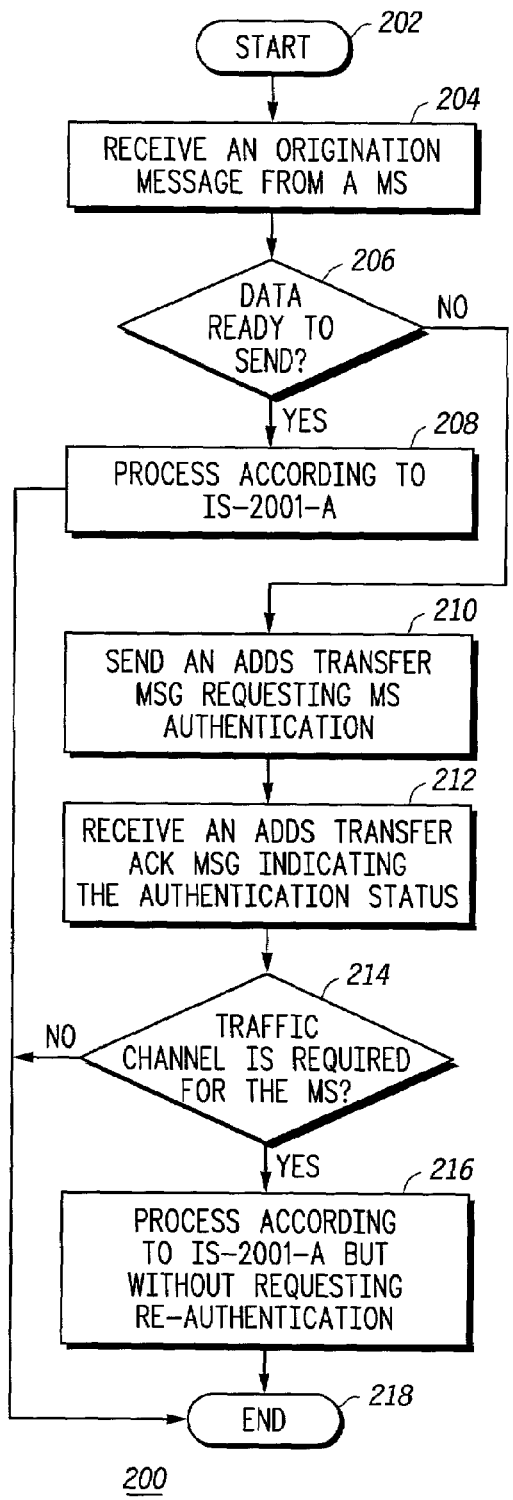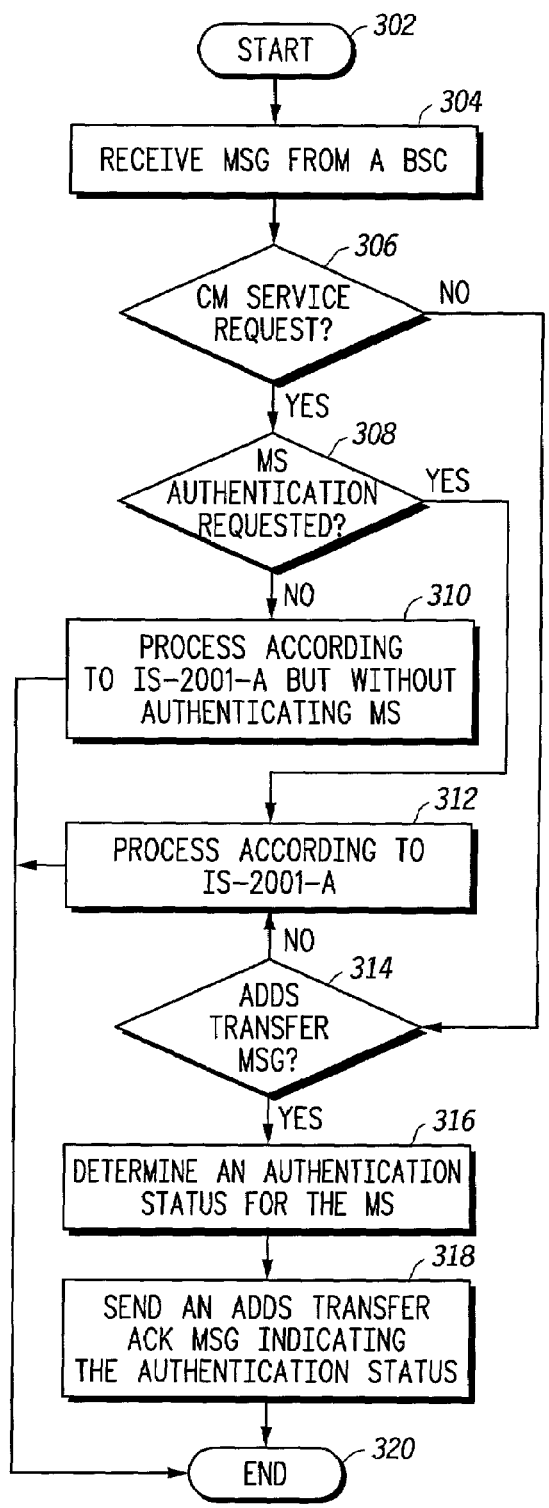
FIG.2
FIG.3

METHOD AND APPARATUS FOR FACILITATING DORMANT MODE, PACKET DATA MOBILE HANDOFFS

REFERENCE(S) TO RELATED APPLICATION(S)

The present application claims priority from provisional application, Ser. No. 60/326,909, entitled "METHOD AND APPARATUS FOR FACILITATING DORMANT MODE, PACKET DATA MOBILE HANDOFFS," filed Oct. 3, 2001, which is commonly owned and incorporated herein by reference in its entirety.

FIELD OF THE INVENTION

The present invention relates generally to wireless communication and, in particular, to dormant mode, packet data mobile handoffs.

BACKGROUND OF THE INVENTION

When an IS-2000 mobile station (MS) requests a dormant mode handoff to a new base site controller (BSC) for a packet data call, an IS-2000 traffic channel is allocated for the handoff. A traffic channel is needed when the MS or packet data serving node (PDSN) have new data to transmit. A traffic channel Is also required for Point-to-Point Protocol (PPP) connection and Mobile IP registration procedures when the dormant mode handoff requires a change in the serving PDSN.

In IS-2001 the establishment of a traffic channel for the MS requires a transport layer connection, a Signaling Connection Control Part (SCCP) connection, to first be established between the mobile switching center (MSC) and the BSC targeted in the handoff. The traffic channel and connection are established by way of the following IS-2001 message exchange between the BSC and MSC:

1. Upon reception of an IS-2000 Origination message, the target BSC sends a CM Service Request message to the MSC. The CM Service Request message includes the mobile's authentication and registration parameters and is encapsulated in a SCCP Connection Request message.

2. The MSC responds with an Assignment Request message to the BSC to request wireless resources for the handoff. This message is normally sent after successful authentication and authorization of the MS. The Assignment Request message is encapsulated in an SCCP Connection Confirm message (or a DTI message if an SCCP Connection Confirm message was previously sent and the SCCP connection was established). An SCCP connection now exists for the call.

3. Upon successful establishment of an A10/A11 connection between the serving PDSN and new PCF, the BSC may send an Assignment Failure (in SCCP DT1) message to the MSC to indicate that assignment of radio resource was not completed. When this message is sent, it is sent not because the traffic channel assignment procedure failed, but because the BSC has determined that a traffic channel is not required for this particular dormant mode handoff. This would occur when there is no data to be transmitted or when the serving PDSN does not change.

4. The MSC sends a Clear Command (in SCCP DT1) message to the BSC requesting release of dedicated resources for the call.

5. The BSC responds with a Clear Complete (in SCCP DT1) message to the MSC acknowledging release of dedicated resources for the call. The MSC subsequently releases the SCCP connection for the call. MSC and BS exchange SCCP RLSD (released) and SCCP RLC (release completed).

The message exchange above illustrates what IS-2001-A currently requires of the BSC and MSC even though the dormant mode packet data handoff did not actually need a traffic channel. A messaging solution that more efficiently addresses dormant mode handoffs when a traffic channel is not needed would make MSC/BSC communication more efficient and conserve communication resources. Thus, there is a need for a method and apparatus to more efficiently facilitate dormant mode, packet data mobile handoffs.

BRIEF DESCRIPTION OF THE DRAWINGS

FIG. 2 is a logic flow diagram of steps executed by a BSC in accordance with the preferred embodiment of the present invention.

FIG. 3 is a logic flow diagram of steps executed by a MSC in accordance with the preferred embodiment of the present invention.

DESCRIPTION OF THE PREFERRED EMBODIMENT

Figure 1:
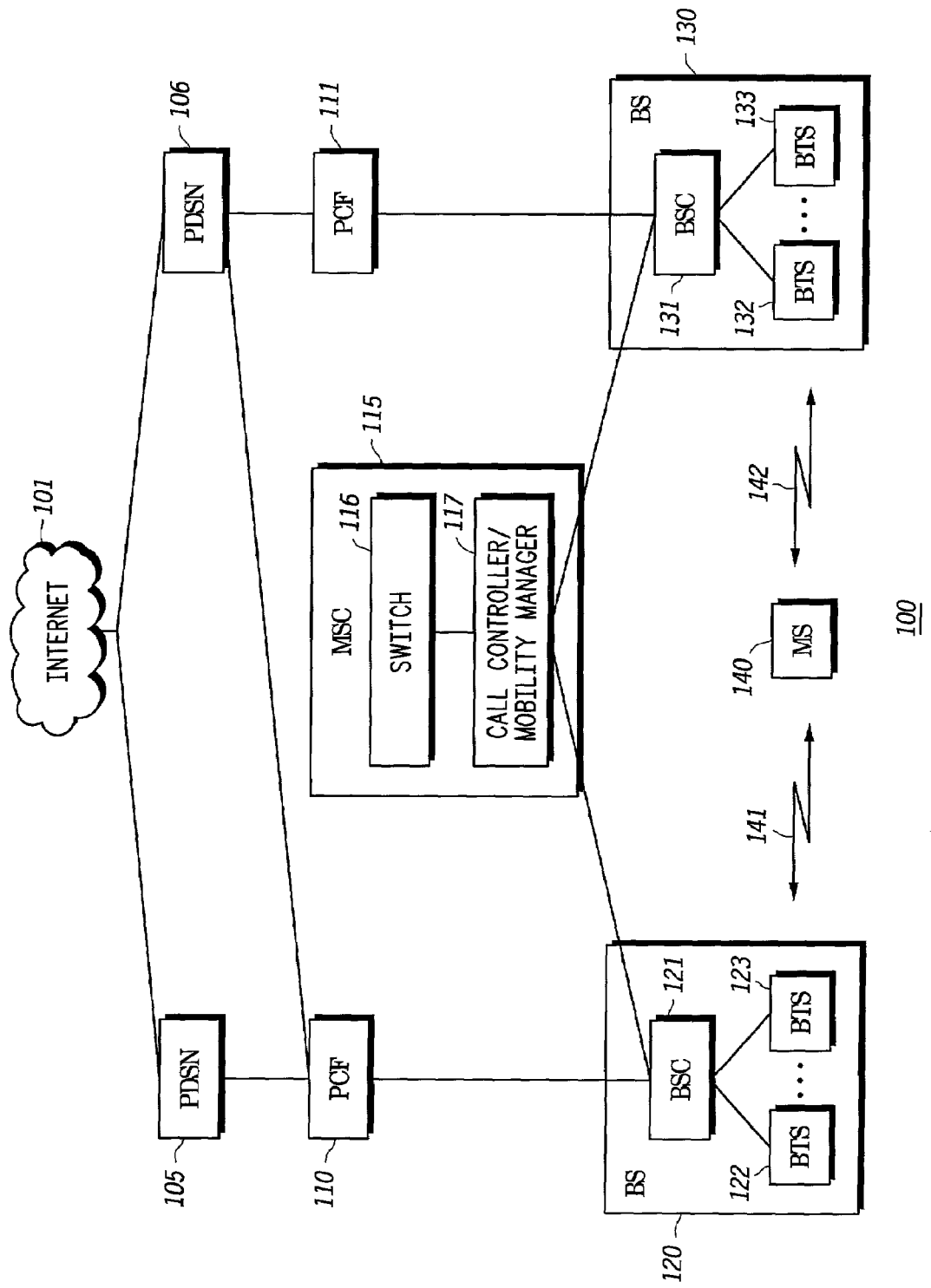
FIG. 1 is a block diagram depiction of a communication system in accordance with a preferred embodiment of the present invention.

To address the need for a method and apparatus to more efficiently facilitate dormant mode, packet data mobile handoffs, the present invention provides more efficient messaging between the BS and MSC involved in the handoff. Prior art messaging that provides for the allocation or establishment of a traffic channel for the MS is streamlined in cases where a traffic channel is not needed. Also, connectionless messages are used to save the processing otherwise required to establish a connection between the BS and MSC. Thus, using the present invention, dormant mode, packet data mobile handoffs can be processed with less signaling and fewer system resources than by using the prior art.

The present invention can be more fully understood with reference to FIGS. 1-3. FIG. 1 is a block diagram depiction of communication system 100 in accordance with a preferred embodiment of the present invention. Preferably, communication system 100 is a system in accordance with the well-known Telecommunications Industry Association/Electronic Industries Association Interim Standard 2001-A (TIA/EIA IS-2001-A or IS-2001-A) modified as described below to implement the present invention. System 100 comprises fixed network equipment and a mobile communication unit. The fixed network equipment, or communication infrastructure, comprises base stations (BSs) 120 and 130, MSC 115, PCFs 110 and 111, and PDSNs 105 and 106. As is well-known in the art, a BS comprises a BSC (e.g., 121 and 131) and one or more base transceiver systems (BTSs) (e.g., 122, 123, 132, and 133), and a MSC comprises a switch (e.g., 116) and a call controller/mobility manager (e.g., 117). The communication infrastructure is also preferably networked to the Internet 101 or alternatively some other internet or intranet. MS 140 preferably comprises a CDMA-capable wireless phone that communicates with BS 120 and 130 via IS-2001-A wireless interfaces 141 and 142, respectively. For simplicity, only two BSs and one MS are shown in FIG. 1. However, such communication systems are known to comprise many more MSs, BSs, and other infrastructure devices than are shown.

The present invention is preferably implemented using software techniques and technologies well-known in the art. In the preferred embodiment, the present invention is implemented in software stored on the memory devices and executed by the processors that BSCs 121 and 131 and call controller/mobility manager 117 comprise. For example, the method described relative to FIG. 2 is preferably implemented in BSC software, while the method described relative to FIG. 3 is preferably implemented in MSC software.

Operation of preferred communication system 100, in accordance with the present invention, occurs substantially as follows. MS 140 is in a packet data dormant state as it begins to handoff from BSC 121 to BSC 131. In accordance with IS-2000, MS 140 sends an Origination message to BSC 131 via wireless interface 142 and via a BTS (e.g., 132 or 133). BSC receives the Origination message, which indicates (via its DRS field) whether MS 140 has data ready to send. If MS 140 has data ready to send, then a traffic channel will be required and prior art messaging can be used to establish this channel for the MS. However, if the Origination message indicates that no data is ready to send, then the MS may not require a traffic channel and the messaging of the present invention is used.

In response to the Origination message, BSC 131 sends an Application Data Delivery Service (ADDS) Transfer message to call controller/mobility manager 117 via the A1 interface requesting authentication of MS 140. The ADDS Transfer message comprises authentication parameters from the MS, an authentication data element computed by the BS, and an indication that the data burst type of the ADDS Transfer message is equal to Asynchronous Data Services. Also, the ADDS Transfer message is a connectionless message, meaning that it is not associated with a transport layer connection. In contrast, prior art messaging relies on the establishment of an SCCP connection between BSC 131 and manager 117.

Manager 117 receives the ADDS Transfer message and determines an authentication status for MS 140. This status may reflect the result of known authentication procedures or simply a passing status while authentication procedures are performed. Manager 117 then sends an ADDS Transfer ACK message to BSC 131 indicating this authentication status. Like the ADDS Transfer message, the ADDS Transfer ACK message is a connectionless message that is not associated with a transport layer connection.

Subsequent to receiving the ADDS Transfer ACK message, BSC 131 proceeds with the handoff processing by sending an A9-setup-A8 message to PCF 111, assuming that a passing authentication status is indicated for MS 140. (In alternate system configurations where the BSC and PCF are collocated, proprietary messaging would likely be used instead of A9 messaging.) Now, in the case that manager 117 indicated a preliminary passing status for MS 140, while authentication procedures continued, and then a final, failing authentication result is determined for MS 140, BSC 131 will receive a second ADDS Transfer ACK message for MS 140 that indicates this failing result. BSC 131 then must appropriately clean up those actions taken on the assumption that MS 140 would be authenticated. This clean up proceeds according to prior art messaging, although BSC 131 is notified of the failure via an ADDS Transfer ACK message.

Returning to the case where MS 140 is properly authenticated, BSC 131, while proceeding with handoff processing, may receive an indication that a traffic channel is required for MS 140 after all. For example, such an indication may take the form of an indication that PDSN 106 has data ready to be sent to MS 140. Since a traffic channel is now required for MS 140, prior art messaging is used, with one exception, to complete the handoff and establish the traffic channel. The BSC 131 sends a modified Connection Management (CM) Service Request message to manager 117. This CM Service Request message differs from an IS-2001-A CM Service Request message by indicating that MS 140 has already been authenticated. Therefore, the authentication processing can be avoided and system resources are not wasted re-authenticating MS 140.

The use of the preferred embodiment of the present invention will result in significant performance improvements during dormant mode handoff. Specifically, a 71% reduction in signaling messages (2 messages verses 7 messages) exchanged between the BSC and the MSC results when the MS can handoff without a traffic channel. Moreover, scenarios in which a traffic channel is required by the MS during such a handoff are rare. The likelihood that data ready for transmission (either to or from the MS) appears precisely during dormant mode handoff is remote. The other case in which a traffic channel is needed is when the MS hands off to a different PDSN. This too is a rare event in typical system configurations. Furthermore, since ADDS Transfer and ADDS Transfer ACK messages are connectionless messages that do not require an SCCP transport connection, additional SCCP resources are available to support calls.

FIG. 2 is a logic flow diagram of steps executed by a BSC in accordance with the preferred embodiment of the present invention. Logic flow 200 begins (202) when the BSC receives (204) an Origination message via a BTS from a MS that wishes to handoff while in a dormant packet data state. If (206) the Origination message indicates that the MS has data ready to send, then a traffic channel will be required for the MS and prior art messaging (per IS-2001-A) will be used (208).

However, if the MS does not have data ready to send, then the BSC sends (210) an ADDS Transfer message to the MSC requesting authentication of the MS. In response, the BSC receives (212) an ADDS Transfer ACK message that indicates the MS's authentication status. Assuming that the MS has a passing authentication status, other prior art dormant handoff messaging proceeds. The logic flow ends (218) as long as the BSC is not notified of the need for a traffic channel during the remainder of the handoff processing. However, if (214) the BSC receives such an indication, then prior art messaging (IS-2001-A) is reverted to, but with the BSC indicating that the MS has already been authenticated (216). Specifically, the BSC will send a modified CM Service Request message to the MSC that indicates that authentication has already been performed. In this way, re-authentication is prevented, and logic flow 200 ends.

FIG. 3 is a logic flow diagram of steps executed by a MSC in accordance with the preferred embodiment of the present invention. Logic flow 300 begins (302) when the MSC receives (304) a message from a BSC. If (306) the message is a CM Service Request message, then it is processed according to IS-2001-A (312), unless (308) the message indicates that authentication has already been performed. If the message so indicates, then it is processed according to IS-2001-A except that no authentication is performed (310).

In the case that the message received is an ADDS Transfer message instead of a CM Service Request (314), the MSC determines (316) an authentication status for the MS and sends (318) an ADDS Transfer ACK message back to the BSC indicating this status. If (314) the message received is neither an CM Service Request nor an ADDS Transfer message, then it is processed according to IS-2001-A (312). Logic flow 300 thus ends (320).

While the present invention has been particularly shown above and described with reference to particular embodiments thereof, it will be understood by those skilled in the art that various changes in form and details may be made therein without departing from the spirit and scope of the present invention.

What is claimed is:

1. A method for facilitating dormant mode handoff comprising the steps of:
   receiving a message indicating whether a mobile station (MS) attempting a dormant handoff has data ready to send;
   when the message indicates that the MS does not have data ready to send,
      sending a connectionless message requesting authentication of the MS in response to the message; and
      receiving a connectionless acknowledgement message indicating an authentication status for the MS.

2. The method of claim 1 wherein the connectionless message comprises an Application Data Delivery Service (ADDS) Transfer message.

3. The method of claim 2 wherein the ADDS Transfer message comprises an indication that a data burst type of the ADDS transfer message is of an Asynchronous Data Services type 4. The method of claim 1 wherein the connectionless message requesting authentication of the MS comprises authentication parameters from the MS, an authentication data element computed by a BS, and an indication that the MS is registering for a packet data dormant mode handoff.

5. The method of claim 4 wherein the connectionless message comprises an indication that authentication is being requested for packet data service.

6. The method of claim 4 wherein the connectionless message comprises an indication that authentication is being requested for dormant mode handoff.

7. The method of claim 1 wherein the connectionless acknowledgement message indicates an authentication result.

8. The method of claim 1 wherein the connectionless acknowledgement message indicates an authentication status for the MS from the group consisting of a passing authentication status and a preliminary passing status.

9. The method of claim 8 further comprising the step of sending, by a base site controller (BSC), an A9-setup-A8 message to a packet control function (PCF) for the MS subsequent to receiving the connectionless acknowledgement message, wherein the BS comprises the BSC.

10. The method of claim 8 further comprising the step of receiving, by the BS in response to the connectionless message and subsequent to receiving the connectionless acknowledgement message, a second connectionless acknowledgement message indicating a failing authentication result for the MS, wherein the second connectionless acknowledgement message is not associated with a transport layer connection.

11. The method of claim 8 further comprising the step of receiving, by a BSC from a packet data serving node (PDSN) via a PCF, an indication that a traffic channel for the MS is required, wherein the BS comprises the BSC.

12. The method of claim 11 wherein the indication that a traffic channel is required comprises an indication that the PDSN has data ready to be sent to the MS.

13. The method of claim 11 further comprising the step of sending, by the BSC, a service request message to a mobile switching center (MSC) that indicates that the MS has already been authenticated.

14. The method of claim 13 wherein the service request message comprises a Connection Management (CM) Service Request message.

15. The method of claim 1, wherein the message indicating whether the MS has data ready to send comprises an origination message.

16. The method of claim 1, wherein neither the connectionless message nor the connectionless acknowledgement message are associated with a transport layer connection.

17. The method of claim 1, wherein receiving the message indicating whether the MS has data ready to send comprises receiving an indication associated with a dormant mode handoff that indicates whether the MS has data ready to send.

18. A base station (BS) comprising:
   a base transceiver system (BTS) arranged to receive a message indicating whether a mobile subscriber (MS) has data ready to send, wherein the MS is attempting to hand off to the BS in a dormant packet data state;
   a base site controller (BSC), coupled to the BTS, arranged to send a connectionless message requesting authentication of the MS in response to the message, when the message indicates that the MS does not have data ready to send, and arranged to receive, in response to the connectionless message, a connectionless acknowledgement message indicating an authentication status for the MS.

19. The base station of claim 18 wherein the connectionless acknowledgement message indicates a passing authentication status for the MS and wherein the BSC is further arranged to send an A9-setup-A8 message to a PCF for the MS subsequent to receiving the connectionless acknowledgement message.

20. The base station of claim 18 wherein the connectionless acknowledgement message indicates a passing authentication status for the MS and wherein the BSC is further arranged to receive, in response to the connectionless message and subsequent to receiving the connectionless acknowledgement message, a second connectionless acknowledgement message indicating a failing authentication result for the MS, wherein the second connectionless acknowledgement message is not associated with a transport layer connection.

21. The base station of claim 18 wherein the connectionless acknowledgement message indicates a passing authentication status for the MS, wherein the BSC is further arranged to receive, from a PDSN via a PCF, an indication that a traffic channel for the MS is required, and wherein the BSC is further arranged to send a service request message to an MSC that indicates that the MS has already been authenticated.

22. The base station of claim 21 wherein the indication that a traffic channel is required comprises an indication that the PDSN has data ready to be sent to the MS.

23. A method for facilitating dormant mode, packet data mobile handoffs comprising the steps of:
   receiving, by a MSC, a connectionless message requesting authentication of a MS during a dormant packet data mode hand off of the MS, wherein the connectionless message is not associated with a transport layer connection;

determining, by the MSC, an authentication status for the MS; and sending, by the MSC in response to the connectionless message, a connectionless acknowledgement message indicating the authentication status, wherein the connectionless acknowledgement message is not associated with a transport layer connection.

24. The method of claim 23 wherein the connectionless message comprises an ADDS transfer message and wherein the ADDS transfer message comprises authentication parameters from the MS, an authentication data element computed by a BS, and an indication that a data burst type of the ADDS transfer message is of an Asynchronous Data Services type.

25. The method of claim 23 further comprising the step of receiving, by the MSC, a service request message that indicates that the MS has already been authenticated.

26. A mobile switching center (MSC) comprising:

a call controller/mobility manger arranged to receive a connectionless message requesting authentication of a MS during a dormant packet data mode hand off of the MS, arranged to determine an authentication status for the MS, and arranged to send, in response to the connectionless message, a connectionless acknowledgement message indicating the authentication status, wherein the connectionless message and connectionless acknowledgement message are not associated with a transport layer connection.

* * * * *